United States Patent [19]

Wiedemann et al.

[11] 4,114,152
[45] Sep. 12, 1978

[54] PULSE RADAR APPARATUS WITH INTEGRATION DEVICE

[75] Inventors: Kurt Wiedemann, Gilching; Reinhard Seiferth, Munich, both of Germany

[73] Assignee: Siemens Aktiengesellschaft, Berlin & Munich, Germany

[21] Appl. No.: 56,013

[22] Filed: Jul. 7, 1970

[30] Foreign Application Priority Data

Jul. 9, 1969 [DE] Fed. Rep. of Germany ....... 1934723

[51] Int. Cl.² .............................................. G01S 9/42
[52] U.S. Cl. .................................. 343/7.7; 343/18 E
[58] Field of Search ................................ 343/18 E, 7.7

[56] References Cited

U.S. PATENT DOCUMENTS

| 3,011,053 | 11/1961 | Sev | 343/18 E |
|---|---|---|---|
| 3,278,936 | 10/1965 | Wolf | 343/18 E |
| 3,365,718 | 1/1968 | Borg | 343/18 E |
| 3,707,718 | 12/1972 | Ames | 343/7.7 |
| 3,821,752 | 6/1974 | McKelvey | 343/7.7 |
| 3,934,253 | 1/1976 | Wiedemann et al. | 343/7.7 |

Primary Examiner—T.H. Tubbesing
Attorney, Agent, or Firm—Hill, Gross, Simpson, Van Santen, Steadman, Chiara & Simpson

[57] ABSTRACT

Pulse radar apparatus employs integration circuits following demodulator circuits to control the suppression of interference signals and prevent the display of interference on a PPI scope.

10 Claims, 6 Drawing Figures

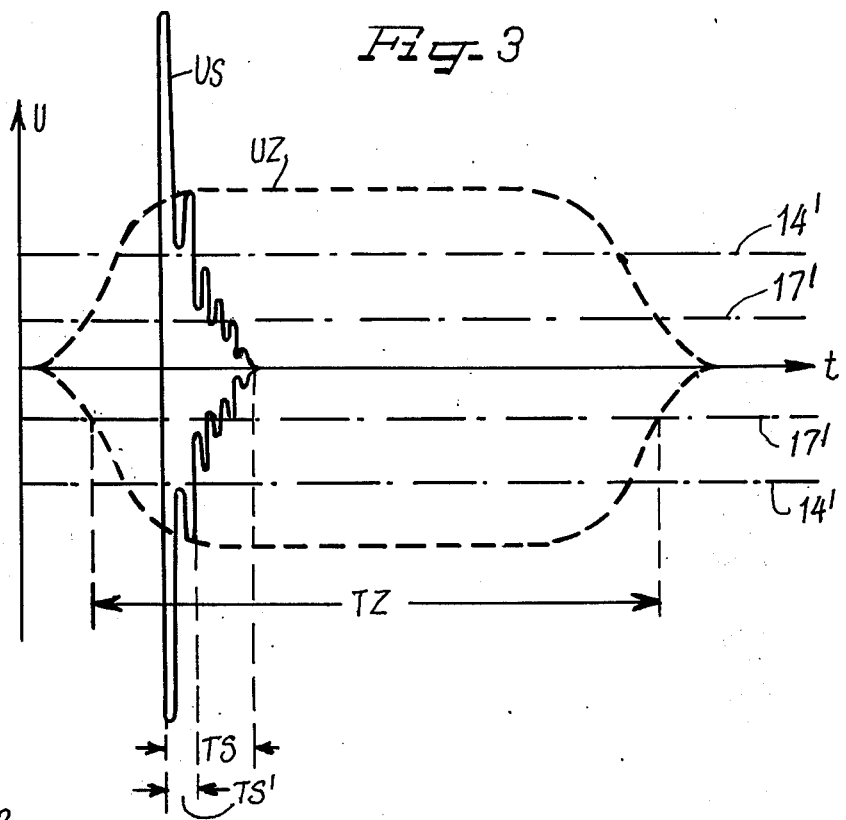
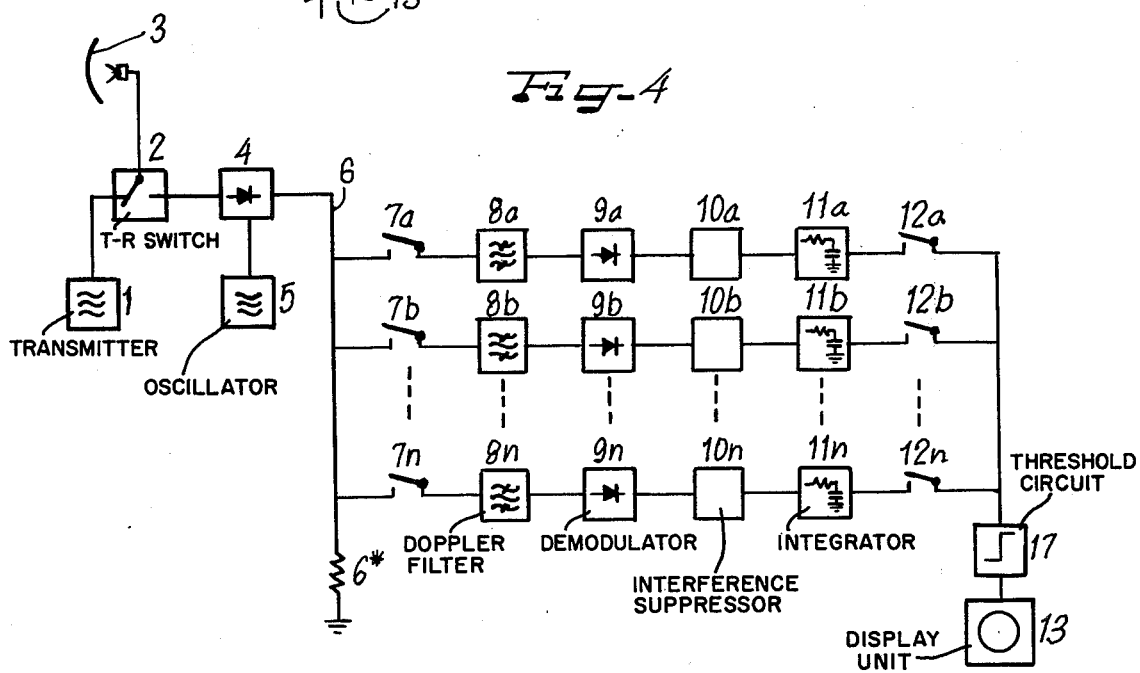

4,114,152

PULSE RADAR APPARATUS WITH INTEGRATION DEVICE

BACKGROUND OF THE INVENTION

1. Field of the Invention

The invention relates to a pulse radar apparatus, and particularly to pulse doppler radar apparatus with range channels, which employs demodulators followed by integration devices for adding up reflected signals coming from the target and retransmitting the same for indication.

2. Description of the Prior Art

It is known that interferences occur owing to pulsed and swept (warbled) interference transmitters and also owing to other radar apparatusses in pulse doppler radar apparatusses. It is the object of the invention to eliminate such type of interferences.

SUMMARY OF THE INVENTION

In accordance with the invention, this is accomplished in a pulse radar apparatus of the initially mentioned type in this manner that for the suppression of pulse type interferences there is determined the steep rise of the interference signals in comparison with the target sweeping time of small duration of the interference signals and in comparison with the target-reflected signal of high amplitude by means of a differentiating device, and that for a portion of the duration of the interference signal the up integration at the integration device is prohibited.

BRIEF DESCRIPTION OF THE DRAWINGS

Other objects, features and advantages of the invention will be best understood from the following detailed description taken in conjunction with the accompanying drawings in which:

FIG. 3 shows, in relation to time, the interference and useful pulse distribution;

FIG. 4 is a block diagram of a radar apparatus in accordance with the invention;

DESCRIPTION OF THE PREFERRED EMBODIMENT

Figure 1:
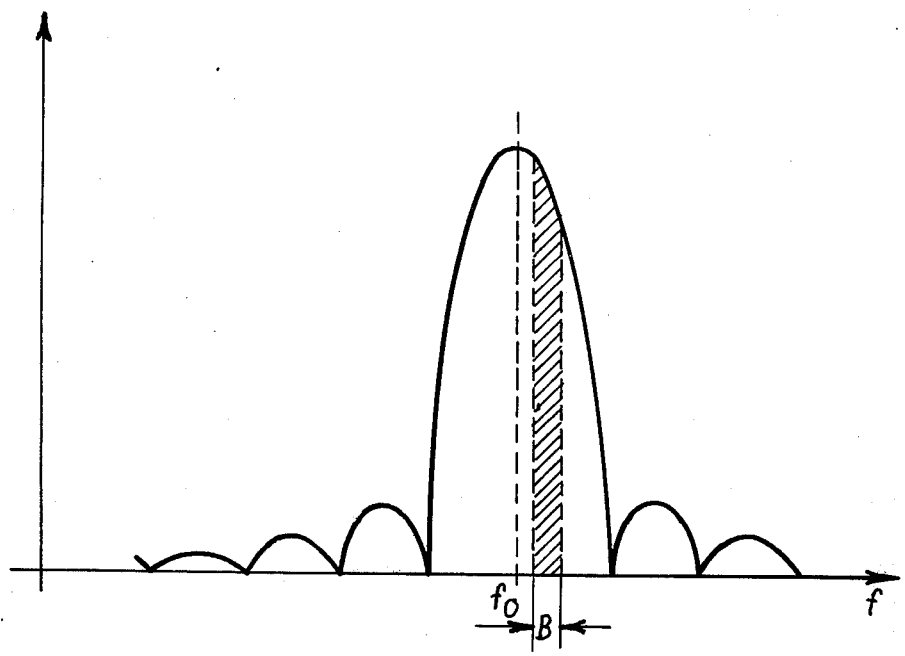
FIG. 1 illustrates the frequency range of an interference pulse.

In FIG. 1 is recorded the outline (or enveloping line) of the amplitudes of a small interference pulse in relation to the frequency $f$. The maximum of this frequency spectrum lies around the carrier frequency $f_o$ of the interference pulse; the shape of the outline of the individual interference frequencies depends on the pulse form. In doppler filters, which serve for the suppression of the indication of fixed targets, it may happen that a portion of such an interference pulse drops into the pass range (for transmission band). In the FIG. 1 this has been indicated for the frequency range B, which lies near the carrier frequency $f_o$ of the center frequency of the interference pulse, whereby the width of the frequency range corresponds to the pass range of a doppler filter. These operating conditions may permit the appearance of a strong signal at the output of the doppler filter which erroneously indicates the presence of a moving target. It is, however, possible to suppress these interference pulses by the introduction of increased indicator thresholds; these thresholds must be so high, however, that practically all of the reflected pulses are suppressed, since they are derived from moving targets and are, therefore, very weak.

Figure 2:
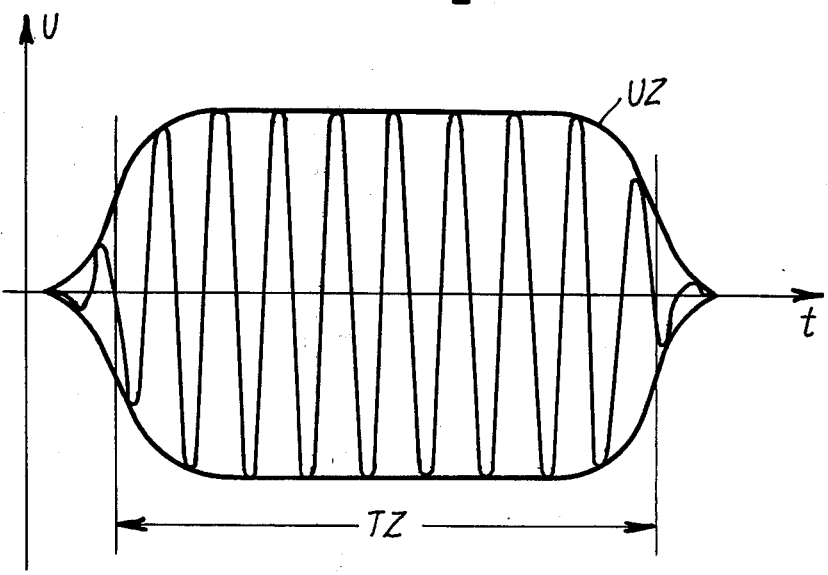
FIG. 2 illustrates the amplitude of the reflected pulses during the sweeping of a target in relation to time.

In FIG. 2 is illustrated the output voltage U of a moving target in relation to the time $t$, namely for a complete sweep of a target by the antenna. The outline of this one passed line from the frequency spectrum of the receiver signal is designated with UZ. It rises corresponding to the antenna characteristic at the beginning very slowly, reaches a maximum at the adjustment of the main beam direction to the target and again decreases slowly during the traveling of the target out of range of the antenna beam. The time period of the target sweeping duration TZ depends on the rotative speed of the antenna and on the antenna beam. In all, the associated reflected pulses comprise at a point-shaped target of a larger number of, for instance, more than 100 individual HF pulses.

In FIG. 3 is illustrated in a dashed outline the voltage UZ of a doppler line according to FIG. 2 in relation to the time $t$. The curve US indicates the characteristic of the outline of an interference pulse (or signal) whose frequency falls into the pass range B of the doppler filter according to FIG. 1. It is shown that the rise of this interference pulse is substantially steeper than the rise of the outline of the target-reflecting pulse UZ. Furthermore, the time period of the interference pulse TS is substantially shorter than the time period of the useful pulse TZ. Also the interference pulses are generally not synchronized with the useful pulses so that they will be in different range channels.

In FIG. 4 is illustrated a block diagram of a radar apparatus which is equipped with an interference suppression device in accordance with the invention. The pulse signals transmitted by a transmitter 1 are conducted by means of a transmitter receiver switch 2 to an antenna 3 and after reflection by a target are again received by the same antenna and then over the transmitter receiver switch 2 reach a mixer 4 whose oscillator is designated with 5. In the same manner interference pulses also together with the reflected signals reach the radar receiver. After one, or if desired also after a plurality of transformations, the reflected signals reach the intermediate frequency position on a distributor bus 6 to which is connected by switches 7a, 7b . . . 7n a number of range channels. This has the result that the reflected signals coming from targets at a predetermined distance will always reach one and the same range channel and in this manner may be added up.

Particularly, in target-following apparatus it is also sufficient to operate with only a single range channel instead of with a plurality of range channels. The distributor bus 6 is closed free of reflection with a resistance 6*. The individual range channels are provided with doppler filters 8a, 8b . . . 8n and also with demodulators 9a, 9b . . . 9n whereby the doppler filters are constructed as band-pass filters and permit a range to pass which is smaller than the pulse-following frequency of the transmission signals of the radar apparatus. Between the doppler filters 8a . . . 8n and the integration devices 11a . . . 11n are arranged interference suppression devices which are designated with 10a, 10b . . . 10n and which serve for the elimination of short-time interference signals. At their outputs the range channels are scanned one after the other in known manner by switches 12a, 12b . . . 12n and their output voltages are conducted to a display unit 13 where the same are indicated for instance in PPI-display in relation to the azimuth angle and the distance. The scanning at the output of the range channels takes place in known manner in sychronism with the reflection of the writing beam on the display unit 13, namely at least once during each target sweeping period, mostly however, a plurality of times.

Figure 5:
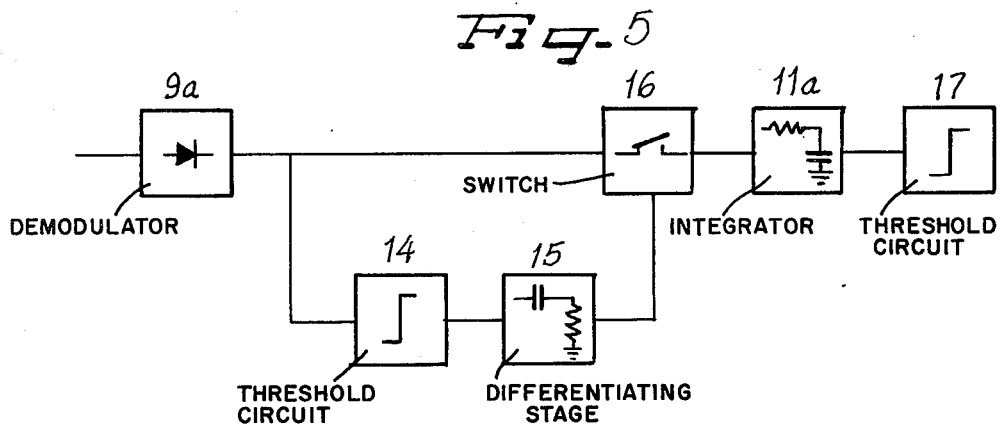
FIG. 5 is a block diagram of an interference suppression device in accordance with the invention.

The block diagram of an interference suppression device 10a is illustrated in FIG. 5. In this figure, the demodulator is also designated with 9a which is followed by a threshold circuit 14, which again is followed by a differentiating stage 15. The same leads to a switch 16 which blocks the feed of the reflected signals from the demodulator 9a to the integration device which here also is designated with 11a; this blocking takes place for a period of time which is short compared with the time period TS according to FIG. 3. The response limit of the threshold circuit 14 is designated with 14' in FIG. 3. A smallest target which shall be just sufficient to effect a response must include in the range channel in front of the integration device at least one portion of its amplitude lying above the line 17' during the target sweeping period. When up-integrated this smallest target produces a value which just exceeds that of the threshold circuit 17 arranged after the integration devices 11a . . . 11n and in front of the display unit 13 (FIG. 4). This threshold level 17' corresponds to the threshold circuit 17. The threshold circuit 17 may be common to all range channels, but may also be present only in one channel as indicated in FIG. 4. In the event that a short time interference pulse is encountered which even though it exceeds the threshold level 17' but still lies below the threshold level 14' (FIG. 3), then this short-time interference, because the locking device 10a still does not respond, will still pass to integration device 11a. This integration device 11a may be constructed as an RC-combination or as a counter device or as a storage device. It leads, however, not to an indication in the display unit 13 because the short-time interference is unable to load the integration device 11a to such an extent that the threshold value of the threshold 17 is exceeded. The threshold value 14' may, therefore, lie considerably above the amplitude of a smallest target. Small reflected signals are, therefore, not influenced by the interference suppression device, so that the probability of the discovery of a target is not impaired.

The short-time interruption of the integration operation about a time period TS' according to FIG. 3, namely during the exceeding of the threshold value 14' by the interference voltage US will, indeed, decrease somewhat a large reflected signal, because the charging of the integration device 11a is interrupted for a short time. This, however, is not particularly disturbing in practice.

Figure 6:
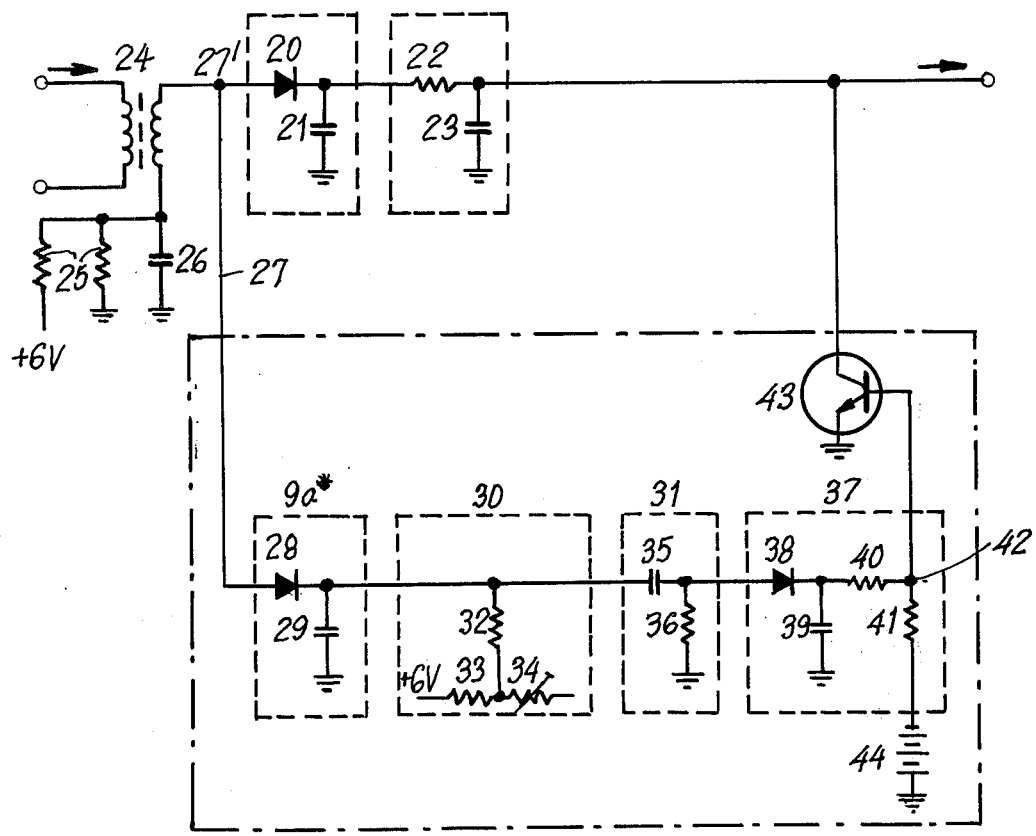
FIG. 6 is a circuit arrangement for effecting the interference suppression in accordance with the invention.

FIG. 6 illustrates the details of a circuit arrangement for practicing the interference scanning operation. The demodulator 9a comprises a rectifier 20 as well as smoothening capacitor 21, so that at the output of this demodulator only the contour of the high frequency signal according to FIG. 2 is available. The integration device 11a comprises a series-arranged resistance 22 as well as a capacitor 23 arranged in a transverse branch. The incoming signal from the distributor bus 6 (FIG. 4) after passing through the doppler filter is conducted over an input transformer 24 which is used for potential division. The resistances 25 serve for the adjustment of the bias voltage for the demodulator 9a. The capacitor 26 connects the transformer 24 on one side to the frame (ground). The transmission line leading to the demodulator 9a has connected at the point 27' a branch line 27 which leads to a further demodulator 9a* which in the same manner as the demodulator 9a consists of a rectifier 28 and a transverse capacitor 29. Both demodulators have, preferably, the same dimensions. The reference numeral 30 indicates a circuit arrangement for adjustment of the threshold voltage for the following differentiating stage 31. The latter contains fixed ohmic resistances 32 and 33 as well as an adjustable resistance 34. With this arrangement the threshold level 14', according to FIG. 3, may be adjusted. The following differentiating stage 31 comprises a capacitor 35 and an ohmic resistance 36 arranged in a transverse branch, whereby this arrangement determines, between capacity value and resistance value, the differentiating properties (rise and descent slope) of this stage. The differentiating stage 31 is followed by a timing stage 37 comprising a rectifier 38, a transverse capacitor 39, as well as ohmic resistance 40 and 41. With these elements the time interval may be determined during which the integration device 11a is short-circuited. The same in the present case depends on the level of the interference signal, that is, a high interference level results in a high charge of the capacitor 39, and this high charge results in a correspondingly long duration of the discharge operation. Therefore, there appears at the point 42 after the resistance 40 a correspondingly long definite potential which is conducted to the base of the transistor 43 so that the transmission range of the latter is controlled. Accordingly, the integration device 11a has its output short-circuited for this time interval and no video signals can reach the display unit 13. At a correspondingly small interference signal level, which still however is above the threshold 14' according to FIG. 3 the charge of the capacitor 39 is correspondingly smaller, so that at the point 42 the required potential for opening the emitting-collector line of the transistor 43 is effective only for a short time. After a definite discharge of the capacitor 39 over the resistance 40 and the base-emitter line of the transistor 43 the potential at 42 had dropped to such a value that at the base of the transistor 43 again the cut-off potential is effective so that a short-circuit and therewith a discharge of the capacitor 39 is again prevented. 44 indicates the source of voltage for producing the cut-off voltage for the transistor 43.

While the invention has been described by reference to a specific embodiment, one skilled in the art may make changes and modifications of the invention without departing from the spirit and scope thereof, and it is to be understood that we intend to include within the patent warranted hereon all such changes and modifications as may be reasonably and properly included within the scope of our contribution to the art.

We claim:

1. A Doppler pulse radar device comprising at least one range channel including a doppler filter, a demodulator connected to the output of said doppler filter, and an interference suppression circuit operable to block said radar device in response to receipt of impulse like interference signals which are of a short duration compared with the target scanning time and of great amplitude compared with target echo signals, said interference suppression circuit including an integrating device for integrating signals from said demodulator for retransmission to a display and means connected between said demodulator and said integrator for detecting the increase of an interference signal which is steep compared with the increase of a moving target echo signal and responsive thereto to prevent integration of a portion of an interference signal during the duration of such signal.

2. Pulse radar apparatus according to claim 1, comprising a threshold device connected in said range channel in front of a differentiating device and having a response limit substantially above the amplitude of a smallest target signal level.

3. Pulse radar apparatus according to claim 2, comprising another threshold device connected to the output of said integrating device and having a response limit of the smallest target signal level.

4. Pulse radar apparatus according to claim 1, comprising means for disconnecting said integrating device upon determination of an interference signal.

5. Pulse radar apparatus according to claim 4, comprising adjustable means for controlling the period of disconnection.

6. Pulse radar apparatus according to claim 1, comprising means for shunting said integrating device upon determination of an interference signal.

7. Pulse radar apparatus according to claim 1, wherein said means for preventing includes means for adjusting the interval of prevention of integration.

8. Pulse radar apparatus according to claim 1, comprising another demodulator connected to receive the same signals as the first-mentioned demodulator, a threshold device connected to said other demodulater and having a response limit, a differentiating circuit connected to the output of said other demodulator via said differentiating circuit, and a timing circuit connected to said differentiating circuit and including a portion connected in shunt with at least a portion of said integrating device, said timing circuit being responsive to differentiated demodulated signals above the threshold response limit of said threshold device to shunt said portion of said integrating device for an interval in accordance with the magnitude and duration of the signal.

9. Pulse radar apparatus according to claim 8, comprising a transistor in the shunting portion of said timing circuit.

10. Pulse radar apparatus according to claim 1, wherein each of said demodulators include a doppler filter connected to their respective outputs.

* * * * *